W. E. ROSS.
HARROW.
APPLICATION FILED NOV. 28, 1910.
1,018,928.
Patented Feb. 27, 1912.
2 SHEETS—SHEET 1.
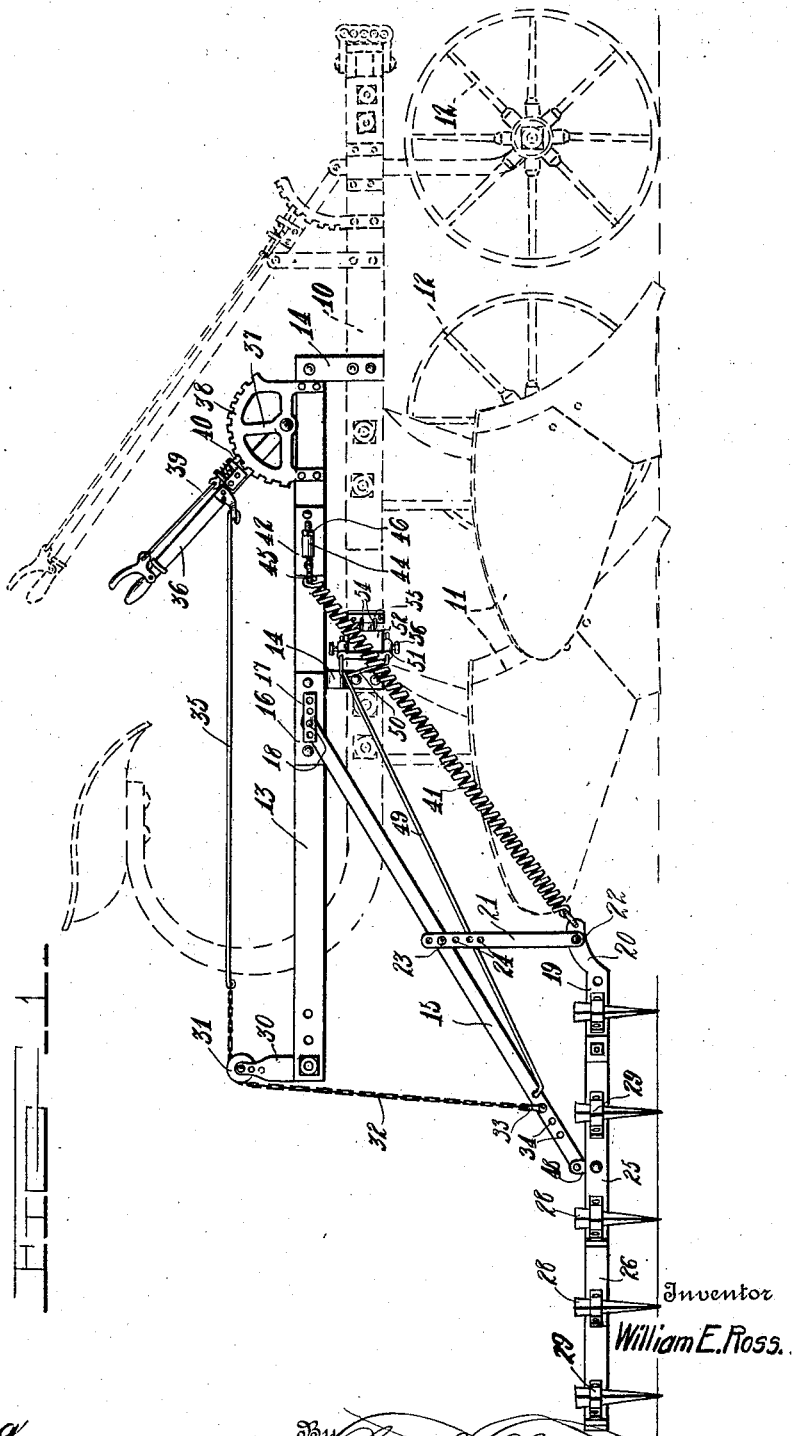
Witnesses
W. C. Fielding
Francis Boyle
Inventor
William E. Ross.
By 
Attorneys

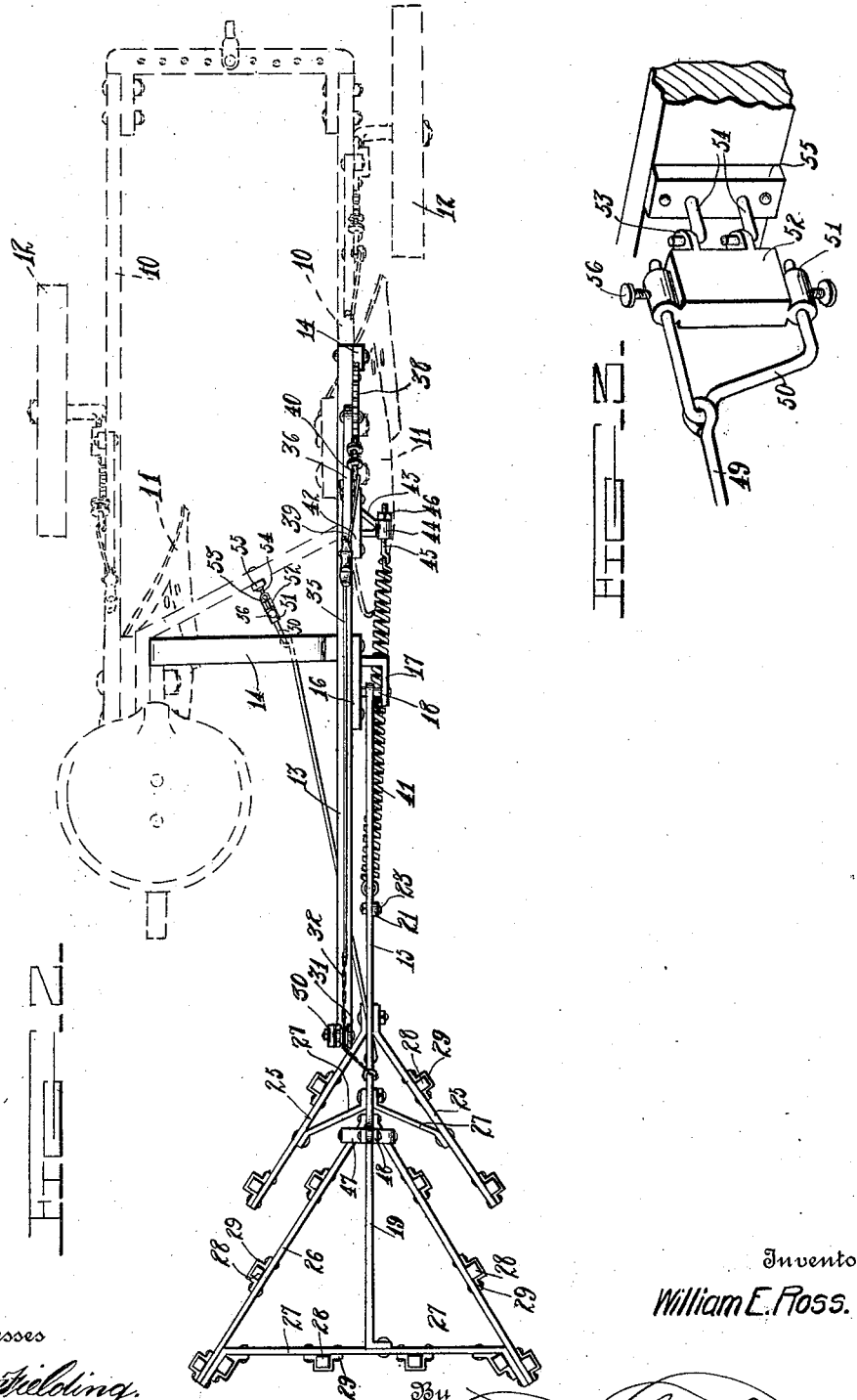

UNITED STATES PATENT OFFICE.

WILLIAM E. ROSS, OF DUQUOIN, ILLINOIS.

HARROW.

1,018,928.  Specification of Letters Patent.  Patented Feb. 27, 1912.

Application filed November 28, 1910. Serial No. 594,609.

*To all whom it may concern:*

Be it known that I, WILLIAM E. Ross, a citizen of the United States, residing at Duquoin, in the county of Perry, State of Illinois, have invented certain new and useful Improvements in Harrows; and I do hereby declare the following to be a full, clear, and exact description of the invention, such as will enable others skilled in the art to which it appertains to make and use the same.

This invention relates to harrows and has for its primary object to provide a harrow that may be so attached to a plow as to be readily adjusted to penetrate into the soil to any desired depth, novel means being employed to yieldingly hold the harrow in its adjusted positions so that the harrow may adapt itself to unevenness in the soil.

With the above object in view the invention consists in certain novel details of construction and combination of parts hereinafter fully described and claimed, it being understood that various modifications may be made in the minor details of construction within the scope of the appended claims.

In the accompanying drawing forming part of this specification:—Figure 1 is a side elevation of a harrow embodying my improvements attached to a plow. Fig. 2 is a plan view of the plow and harrow shown in Fig. 1. Fig. 3 is a perspective view of the lateral adjusting arm attaching means.

Referring now to the drawing in which like characters of reference designate similar parts, a conventional plow is illustrated comprising a beam 10, a share 11, and an adjustable gage wheel 12 on the beam in advance of the share. These parts form no part of the present invention being simply shown to illustrate a plow of ordinary construction to which the invention may be attached.

The harrow comprising the subject-matter of this invention consists essentially of a straight elongated attaching iron 13 which is arranged above and in parallelism with the plow beam and projects rearwardly beyond the beam as shown. A pair of spaced upstanding bars 14 are bolted at their opposite ends to the beam and attaching iron and rigidly secure the parts together. Pivotally secured to one side of the attaching iron above the rear end of the beam is a lifting rod 15, this rod extending considerably beyond the rear end of the attaching iron and being pivotally connected to the harrow frame which will be presently described. The pivotal connection of the lifting rod with the attaching iron may be constructed in any preferred manner, a practical expedient being to fix to one side of the attaching iron a bracket comprising a base plate 16 from the outer face of which projects an angle iron finger 17 through which and the base plate suitable openings are formed to receive a pivot pin 18 which projects laterally from the forward end of the lifting rod.

The harrow comprises a draft beam 19 which is provided at its forward end with an upwardly curving goose-neck 20, that underlies the approximate central portion of the lifting rod and is connected thereto through the instrumentality of an upstanding link 21, bolts 22 and 23 being passed through the link and goose neck and through the link and lifting rod respectively to attain this end. In order that the inclination of the draft iron may be varied relatively to the lifting rod, a plurality of orifices 24 are formed in the upper end of the link through which the bolt 23 may be selectively engaged. A pair of outwardly inclined wings 25 are secured at their forward ends to the draft iron, and a pair of similar wings 26 are secured at their forward ends to the draft iron in rear of the first named wings, both pairs of wings being held in rigid relation to the draft iron through the instrumentality of cross braces 27 bolted at their inner ends to the draft iron and at their outer ends to the inner faces of the wings. A plurality of teeth 28 are secured at spaced intervals along the outer faces of both pairs of wings, strap brackets 29 being utilized in securing the teeth in position as shown.

For yieldingly holding the above described harrow in the soil and for adjusting the depth to which the harrow will penetrate, the following mechanism is employed: A bifurcated bracket arm 30 is fixed in upright position to the rear end of the attaching iron, a sheave 31 being mounted in the bifurcation of the bracket. Trained over the sheave is a link chain 32, one end of which is loosely connected to the lifting rod 15 by a clevis 33, this clevis being selectively engaged in a series of openings 34 formed in the lifting rod to adjustably secure the chain to the rod. To the opposite end of the chain is attached one end of a link 35, this link extending forwardly along the plow beam and being loosely connected at its forward end to the intermediate portion of a handle lever 36. Upon thrusting forward this lever the harrow will be lifted bodily through the instrumentality of the cable just described, and upon thrusting rearwardly this lever, the harrow will be lowered to its operative position. To limit downward movement of the harrow, the lever is pivoted at its lower end to the spider 37 of a notched segment 38, a spring latch 39 being secured to the lever and equipped with a dog 40 which operatively engages the segment. Through the instrumentality of this segment and dog, the lever may be locked at any position desired, the harrow gravitating as the lever is thrust rearwardly until its teeth penetrate the soil. For yieldingly holding the harrow in its operative position a helical spring 41 is loosely connected at one end to the goose neck of the harrow and is adjustably connected at its other end to the draft iron, this spring operating to exert a constant forward pull upon the harrow, and by virtue of the harrow being pivotally connected to the draft iron by the lifting rod 15, the spring will tend to rock the harrow in an arc of a circle of which circle the lifting rod is the radius, and thus will at all times hold the harrow firmly down into the soil.

It is obvious that the harrow may be maintained in a horizontal plane or may be inclined relatively to the plow beam by selectively engaging the bolt 23 in the opening 24 which will accomplish this end.

For adjustably securing the forward end of the spring to the attaching iron so that the tension of the spring may be varied, a bracket is employed including a base plate 42 which is bolted or otherwise secured to the side of the draft iron, an arm 43 extending from this base plate and being provided with a tubular bearing box 44 in which works the shank of a J-bolt 45, the bill of this bolt operatively engaging the forward ends of the spring, and an adjusting nut 46 being arranged on the bolt and bearing against the forward face of the bearing as shown, manipulation of this nut causing the advance or retraction of the bolt in the bearing with consequent varying of the tension of the spring.

It will here be noted that the lifting rod 15 is loosely connected to the approximate central portion of the harrow draft iron 19, connection between the parts being made by a bracket including a base plate 47 which is fixed to the upper faces of the draft iron and forward ends of the rearmost wings 26, and is equipped on its upper face with a pair of upstanding ears 48 between which the rear end of the lifting rod is engaged, a pivot pin being passed through the ears and rod to pivotally secure the parts together. In order to shift the harrow laterally to adjust the harrow to varying conditions during harrowing, a link 49 is loosely connected at one end to the lifting rod 15, and is provided at its other end with an eye which encircles a staple 50, the legs of this staple being slidably fitted in tubular bearings 51 which are mounted on the opposite ends of an oblong block 52, this oblong block being hingedly connected to the cross beam of the plow, through the instrumentality of hinge ears 53 on the block interfitting with hinge lugs 54 carried upon a plate 55 which is bolted or otherwise rigidly secured to the cross bar. Set screws 56 are threaded into the tubular bearings 51 and bear against the legs of the staple. By advancing the legs of the staples through the bearings in the direction of the cross bar, the link 49 will be drawn in the direction of the cross bar and will shift the harrow toward the longitudinal center line of the plow, and when the legs of the staple are slid outwardly in the tubular bearings, the harrow will be shifted away from the longitudinal center line of the plow.

What is claimed, is:—

1. The combination with a harrow having a draft beam, of attaching means including an elongated attaching iron, a lifting rod pivotally secured to said attaching iron and to said draft beam, a helical spring secured to said attaching iron and to said beam in advance of said lifting rod, a stand link secured to said draft beam and to said lifting rod and spanning the space between said rod and said spring, and a flexible lifting means attached to said lifting rod.

2. The combination with a harrow having a draft beam, of an attaching means including an attaching iron, a lifting rod pivotally connected to said attaching iron and to said draft beam, a helical spring secured to said attaching iron and to the leading end of said draft beam, a stand link secured to the leading end of said draft beam and to said lifting link, means for rocking said lifting rod on its pivot, and combined shifting and bracing means carried by said lifting link including a link loosely connected at one end to said lifting link, and means at the opposite end of said link for adjustably securing the link to a rigid support.

3. The combination with a harrow of attaching means including an attaching iron, a lifting rod pivotally secured to said attaching iron and depending therefrom, and pivotally secured at its free end to said draft beam, a helical spring terminally secured to said attachment iron and to the leading end of said draft beam, a spacing link carried by the free end of said draft beam and secured to said lifting rod, and combined bracing and shifting means carried by said lifting rod including a link loosely connected at one end to said lifting rod, a swinging member adapted to be secured to a rigid support and having a tubular bearing, and an adjusting element loosely connected at one end to the last named link and adjustably held within said bearing.

4. A harrow including a longitudinal draft beam, an attaching iron disposed above and substantially parallel with said draft beam, a lifting rod pivotally secured to the intermediate portion of said beam and inclining upwardly therefrom, a pivotal connection between the upper end of said link and said attaching iron, a helical spring secured to said attaching iron in advance of said lifting rod and secured at its lower end to the free end of said draft beam, and a spacing link connected at one end to the free end of said draft beam and adjustably connected at its opposite end to said lifting rod.

5. A harrow having a draft beam, an attaching iron above and arranged approximately parallel with said draft beam, a lifting rod pivotally connected at one end to the intermediate portion of said attaching iron and pivotally connected at its opposite end to the intermediate portion of said draft beam, a helical spring connected at one end to the forward end of said draft beam and adjustably connected at its opposite end to said attaching iron in advance of said lifting rod, a spacing rod connected at one end to the forward end of said draft beam and adjustably connected at its opposite end to the intermediate portion of said lifting rod, an operating lever on said attaching iron, a sheave on said attaching iron, and a flexible cable trained over said sheave and connected at its opposite ends to said lifting rod and to said lever.

WILLIAM E. ROSS.

Witnesses:
E. B. MACLIN,
HENRY HORN, Jr.

---

Copies of this patent may be obtained for five cents each, by addressing the "Commissioner of Patents, Washington, D. C."